United States Patent
Brault et al.

(10) Patent No.: US 11,274,554 B2
(45) Date of Patent: Mar. 15, 2022

(54) TURBOMACHINE WITH AXIAL FORCE RECOVERY AT THE FAN VIA PRESSURIZED GAS FEED

(71) Applicant: SAFRAN AIRCRAFT ENGINES, Paris (FR)

(72) Inventors: Michel Gilbert Roland Brault, Moissy-Cramayel (FR); Julien Fabien Patrick Becoulet, Moissy-Cramayel (FR); Amelie Argie Antoinette Chassagne, Moissy-Cramayel (FR); Didier Jean-Louis Yvon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 177 days.

(21) Appl. No.: 16/552,950

(22) Filed: Aug. 27, 2019

(65) Prior Publication Data

US 2020/0072053 A1 Mar. 5, 2020

(30) Foreign Application Priority Data

Aug. 28, 2018 (FR) ...................... 1857715

(51) Int. Cl.
*F01D 3/00* (2006.01)
*F01D 25/16* (2006.01)

(52) U.S. Cl.
CPC .............. *F01D 3/00* (2013.01); *F01D 25/16* (2013.01); *F05D 2220/32* (2013.01);
(Continued)

(58) Field of Classification Search
CPC ... F01D 3/00; F01D 3/02; F01D 25/16; F05D 2220/32; F05D 2240/52; F05D 2240/56; F05D 2260/60
See application file for complete search history.

(56) References Cited

U.S. PATENT DOCUMENTS 3,491,536 A 1/1970 Hadway
4,789,253 A 12/1988 Perego
(Continued)

FOREIGN PATENT DOCUMENTS

DE 3801590 A1 8/1988
EP 2050932 A2 4/2009
(Continued)

OTHER PUBLICATIONS

Preliminary Research Report received for French Application No. 1857715, dated May 6, 2019, 2 pages (1 page of French Translation Cover Sheet and 1 page of original document).

*Primary Examiner* — David E Sosnowski
*Assistant Examiner* — Maxime M Adjagbe
(74) *Attorney, Agent, or Firm* — Womble Bond Dickinson (US) LLP

(57) ABSTRACT

A turbomachine having a fan shaft supported by a first bearing positioned downstream of the fan, the first bearing including an outer ring attached to an annular support secured to the stator. The turbomachine includes at least one gas feed duct leading into an enclosure positioned against the disc, the gas feed duct being adapted to be fed at a second end with pressurized gas taken from an airstream of a high-pressure compressor of the turbomachine, so that the gas applies an axial force towards upstream on the disc during some operating phases of the turbomachine. The turbomachine further includes a ferrule imperviously sealing the enclosure.

18 Claims, 7 Drawing Sheets

(52) U.S. Cl.
CPC ...... *F05D 2240/52* (2013.01); *F05D 2240/56* (2013.01); *F05D 2260/60* (2013.01)

(56) References Cited

U.S. PATENT DOCUMENTS

| | | | |
|---|---|---|---|
| 2015/0285090 A1* | 10/2015 | Munsell | F04D 29/325 |
| | | | 415/1 |
| 2017/0152754 A1* | 6/2017 | Leutard | F01D 25/186 |
| 2017/0219009 A1 | 8/2017 | Fletcher et al. | |

FOREIGN PATENT DOCUMENTS

| | | |
|---|---|---|
| WO | 2012/038667 A1 | 3/2012 |
| WO | 2014/164601 A1 | 10/2014 |

\* cited by examiner

TURBOMACHINE WITH AXIAL FORCE RECOVERY AT THE FAN VIA PRESSURIZED GAS FEED

GENERAL TECHNICAL FIELD

The present invention relates to turbomachines, and more particularly concerns recovery of axial force at a fan of a turbomachine.

PRIOR ART

A two-spool turbomachine, as is conventional, comprises a rotor comprising a fan. The fan speed relative to the low-pressure shaft is modified by reduction gearing e.g. gearing of epicyclic type having a ring gear secured to the fan.

Axial forces are produced by rotation of the fan blades, generated in particular by spinning of the fan blades i.e. twisted deformation of the blades when the engine is in operation. These axial forces are applied to the fan rotor and are taken up by a thrust bearing guiding the movement of the fan, this latter bearing is preferably a ball bearing.

Turbomachines are usually designed so that the axial force at the fan rotor is applied in a preferred direction. In most flight phases the axial force applied by the fan on the thrust bearing is oriented towards the front of the engine, in the upstream direction relative to the air flow in the low-pressure section, the fan spinning in air and propelling the aircraft. The fan is therefore held in abutment towards upstream.

However, in some operating phases (e.g. idling, transient phase, engine stop/start, fan autorotation) this axial force may be weak or may be applied in reverse direction. This may translate as degradation of the thrust ball bearing.

In particular, when the axial force passes through points where it is zero, the balls no longer lie flat against the outer and inner races of the bearing, axial float being generated at the ball bearing. By «axial float» it is meant loss of bearing of the balls against the outer and inner races or an oscillatory movement of the balls relative to the outer and inner races, this movement having a component parallel to the engine axis. Repeated impacting between the balls and outer and inner races may accelerate wear of the bearing, in particular in the event of repeated alternation in the direction in which the axial force is applied on the bearing.

In addition, if the turbomachine comprises reduction gearing to modify the rotational speed of the fan, the axial forces applied on the fan rotor can also cause load instabilities detrimental to the proper functioning and lifetime of the reduction gearing, e.g. accelerating wear of the chevron-shaped teeth of the gearing.

To maintain the axial force applied on a turbomachine rotor in one same direction, systems are known with pistons arranged in the vicinity of the rotating parts, to apply pressure to a surface of an element connected to the fan rotor.

However, known piston systems are not able to provide sufficient pressurization to obtain thrust on the fan rotor, in particular for engine architecture with reduction gearing. There is still a possibility therefore that the axial force on the fan may be applied in reverse direction under certain operating conditions of the turbomachine.

GENERAL DESCRIPTION OF THE INVENTION

There is a consequent need for a device which is of simple implementation and which ensures that the axial force applied on the thrust ball bearing is maintained in the preferred direction thereof in all the operating phases of the turbomachine.

A further objective of the invention is to provide a solution to this effect which does not require significant changes to the architecture of the turbomachine or high energy consumption.

The invention, for this purpose, concerns a turbomachine according to claim 1.

In the invention, the enclosure positioned downstream of the fan blades can be pressurized with the gas injected via the gas feed duct or ducts. Said gas is taken from the high-pressure compressor and a ferrule seals the enclosure to ensure the imperviousness thereof, thereby allowing gas to be conveyed into the enclosure at sufficient pressure to compensate the aerodynamic forces exerted on the fan during some flight phases (in particular flight idling). Every bleed stage of the high-pressure compressor can be selected to supply the duct with gas.

In this manner, the axial load on the first bearing is at all times oriented in the same direction and is not reversed. The rolling part of the first bearing is maintained in axial abutment, which allows wear of the first bearing to be reduced and extends the lifetime thereof.

One additional advantage of the invention is that it affords protection for any reduction gearing which may be associated with the fan, and in particular for the teeth of said gearing, against degradation over time due to axial load transmitted by the shaft.

The turbomachine of the invention can have the following nonlimiting characteristics taken alone or in combination:
- the gas feed duct is provided with a valve to control the conveying of gas into the enclosure;
- the enclosure is limited longitudinally by the disc and by a bearing support surrounding the shaft and the first bearing, a gas feed duct leading into a cavity made in the bearing support;
- a gas feed duct leads into the enclosure at a piercing facing a side portion of the disc e.g. in the vicinity of an outer wall of largest radius of the enclosure, preferably facing the vanes of a first-stage airflow straightener, or in the vicinity of an outer wall of smallest radius of the enclosure;
- the shaft is also supported by a second bearing positioned upstream of the first bearing, said second bearing comprising an outer ring attached to the annular support secured to the inlet casing, a gas feed duct opening in the vicinity of said second bearing;
- the ferrule is arranged level with and facing the vanes of a first-stage airflow straightener;
- the ferrule comprises a labyrinth seal or dual-brush seal;
- the turbomachine also comprises at least one pressurizing tube leading into the enclosure, the pressurizing tube comprising a check valve;
- the first bearing comprises a ball bearing;
- the turbomachine also comprises reduction gearing to modify the rotational speed of the fan.

DESCRIPTION OF THE FIGURES

Other characteristics and advantages of the invention will become more apparent from the following description which is solely illustrative and nonlimiting, and is to be read in connection with appended Figures among which.

DESCRIPTION OF EMBODIMENTS

In the appended Figures, similar elements carry the same number references.

Axial Forces Generated on the Bearings During Engine Operation

Figure 1:
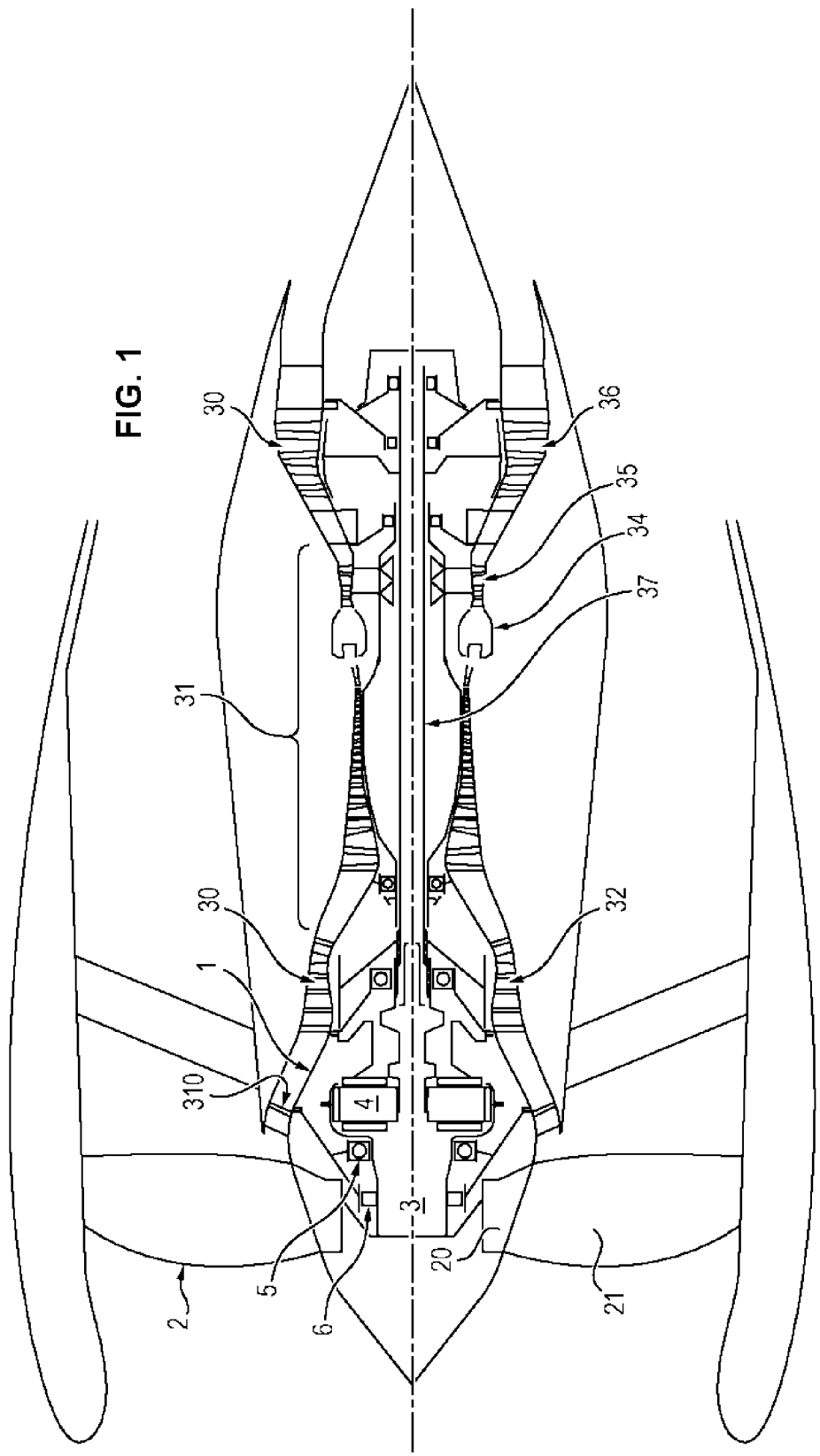
FIG. 1 is a schematic overall view of a twin-spool turbomachine with reduction gearing.

FIG. 1 is an overall view of a turbomachine with reduction gearing. Said turbomachine, as is conventional, comprises a fan 2 and a primary core which, in the direction of flow, comprises a low-pressure compressor 32 (particularly comprising a first-stage airflow straightener 310), a high-pressure compressor 33, combustion chamber 34, high-pressure turbine 35, low-pressure turbine 36 and exhaust nozzle. The high-pressure compressor 33 and the high-pressure turbine 35 form a high-pressure section 31. The low-pressure compressor 32 and the low-pressure turbine 36 form a low-pressure section 30. The various rotor elements of the turbomachine, as axis of rotation, use axis 37 of the turbomachine, illustrated by a horizontal dotted line in FIG. 1.

The fan 2 notably comprises a fan disc 20 provided with fan blades 21 on the periphery thereof. When the blades 21 are set in rotation, they send the air flow into the primary and secondary flow spaces of the turbomachine. The fan disc 20 is driven in rotation by a fan shaft 3. The fan shaft 3 is secured to the fan disc 20 and to a shaft of the reduction gearing mechanism (hereafter gearing) 4. In particular, the gearing can be of epicyclic type e.g. gearing with pinions having chevron-shaped teeth comprising a sun gear, ring gear and several planet gears. The functioning of the gearing 4 is conventional and will not be described herein. The gearing 4 allows modification to the rotational speed of the fan and to the torque between the low-pressure turbine and the fan.

Also, the turbomachine in FIG. 1 comprises a series of bearings to support the rotation of the rotating elements and in particular, downstream of the turbomachine, a first bearing 5 and a second bearing 6. The shaft 3 driving the fan 2 in rotation, via the two bearings 5 and 6, is mounted in rotation relative to the stator and in particular relative to the inlet casing 1 which is secured to the stator.

Figure 2A:
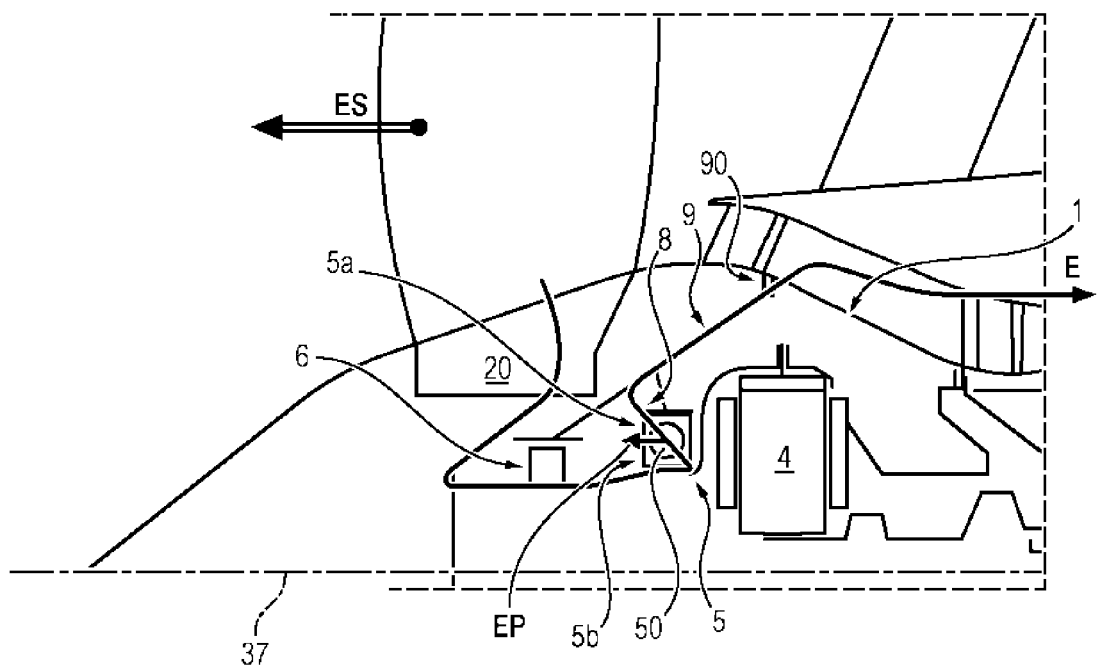
FIG. 2a is a front view of an engine in the prior art, schematically illustrating the axial force at a bearing during a normal flight phase.

FIGS. 2a et 2b schematically illustrate the overall structure of the two bearings 5 and 6, and the pathway of axial forces generated on bearing 5 under conditions of normal operation of the turbomachine (cruising phase) and an idling phase of the turbomachine respectively.

Figure 2B:
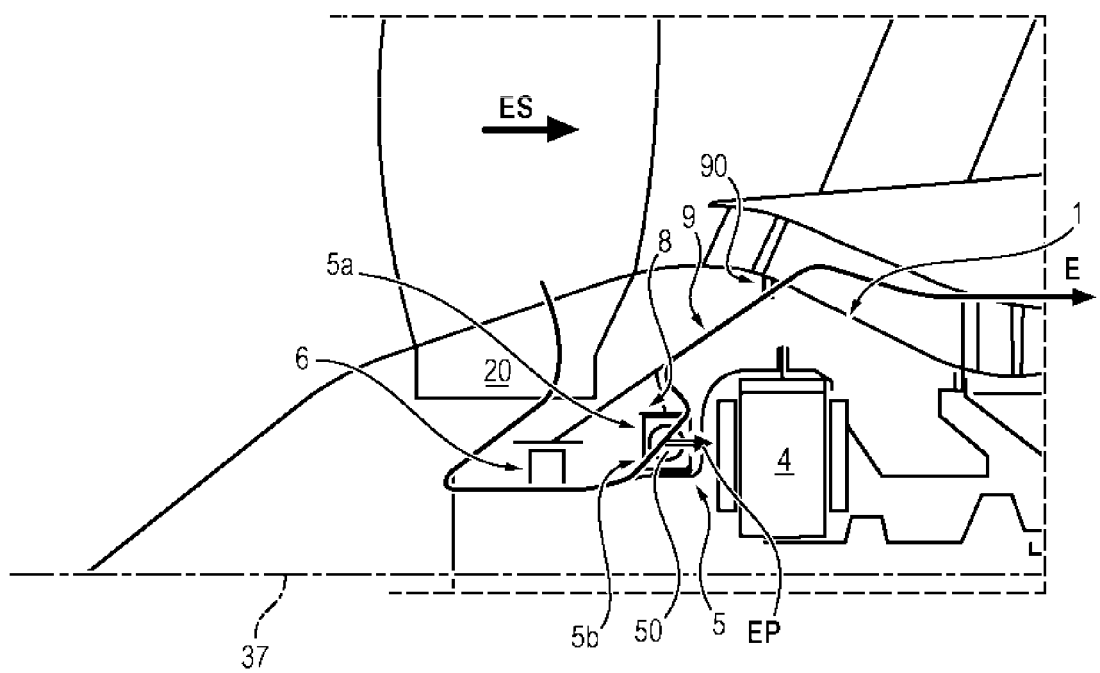
FIG. 2b is a front view of the engine in FIG. 1 schematically illustrating the axial force at the same bearing during an idling phase.

The function of bearing 5 is to guide the rotation of the fan shaft 3 relative to the inlet casing 1 of the turbomachine. Bearing 5 is positioned axially behind the fan disc 20 and around the fan shaft 3. Bearing 5 comprises an outer ring 5a attached to an annular support 8 extending from an inner wall of a bearing support 9. The bearing support 9 connects the bearings 5 and 6 to the inlet casing 1; bearing 5 transmits the thrust of the fan 2 to the casing via the bearing support 9. Support 9 extends radially as far as a flange 90 that is fixed relative to the inlet casing 1, the flange 90 here being positioned underneath an airflow straightener stage 310. The outer ring 5a of bearing 5 and the annular support 8 are therefore attached to the casing 1 of the turbomachine. Bearing 5 also comprises an inner ring 5b connected to the fan shaft 3. In FIGS. 2a and 2b, bearing 5 is a ball bearing comprising balls 50; however other types of bearing could be substituted for the balls 50.

The bearing 5 therefore forms an axial stop linked to the stator on which the shaft 3 is able to apply an axial force under the effect of rotation of the fan.

The front part of the turbomachine in FIGS. 2a and 2b also comprises a second bearing 6 positioned upstream of the first bearing 5 and attached to the fan shaft 3. This bearing is arranged in a bore provided for this purpose. Bearing 6 here is a cylindrical roller bearing; however other types of bearing could be envisaged.

FIG. 2a schematically illustrates the axial force ES at the fan disc 20. Under normal operation, for example during a flight cruising phase, the fan spins in the surrounding air and propels the aircraft, generating the axial force ES applied in upstream direction of the engine. A thick-lined arrow illustrates the pathway of the axial forces E within the various elements of the front part of the engine; the axial force at the disc 20 is transmitted to the bearing 6 positioned the furthest upstream of the turbomachine, then to the thrust bearing 5 of the fan, to the bearing support 9 (described below) and finally to the casing 1. At bearing 5, a subsequent generated axial force EP is more particularly illustrated that tends to set the balls 50 of bearing 5 in abutment towards upstream.

Therefore, during normal operating phases, the axial force at the fan holds the bearing 5 in abutment and an axial float phenomenon at the bearing is prevented.

FIG. 2b illustrates the axial forces during an idling phase; the aerodynamic force exerted on the fan 2 creates an axial force ES in opposite direction, towards downstream of the engine. The pathway of the axial forces E is illustrated by a thick line. The axial force EP at bearing 5 is directed downstream. During transient phases of idling or flight approach, the forces ES and EP can be applied at times downstream and at times upstream, passing through points of zero axial force, which can create impacts at the bearing and axial float. The different phases of operation of the turbomachine can particularly be identified in relation to a predetermined threshold rotation speed. Over and above this threshold it is considered that the turbomachine is in take-off or cruising phase. Below said threshold it is considered that the turbomachine is in flight idling phase or approach phase.

Generation of Axial Force on the Fan

Figure 3:
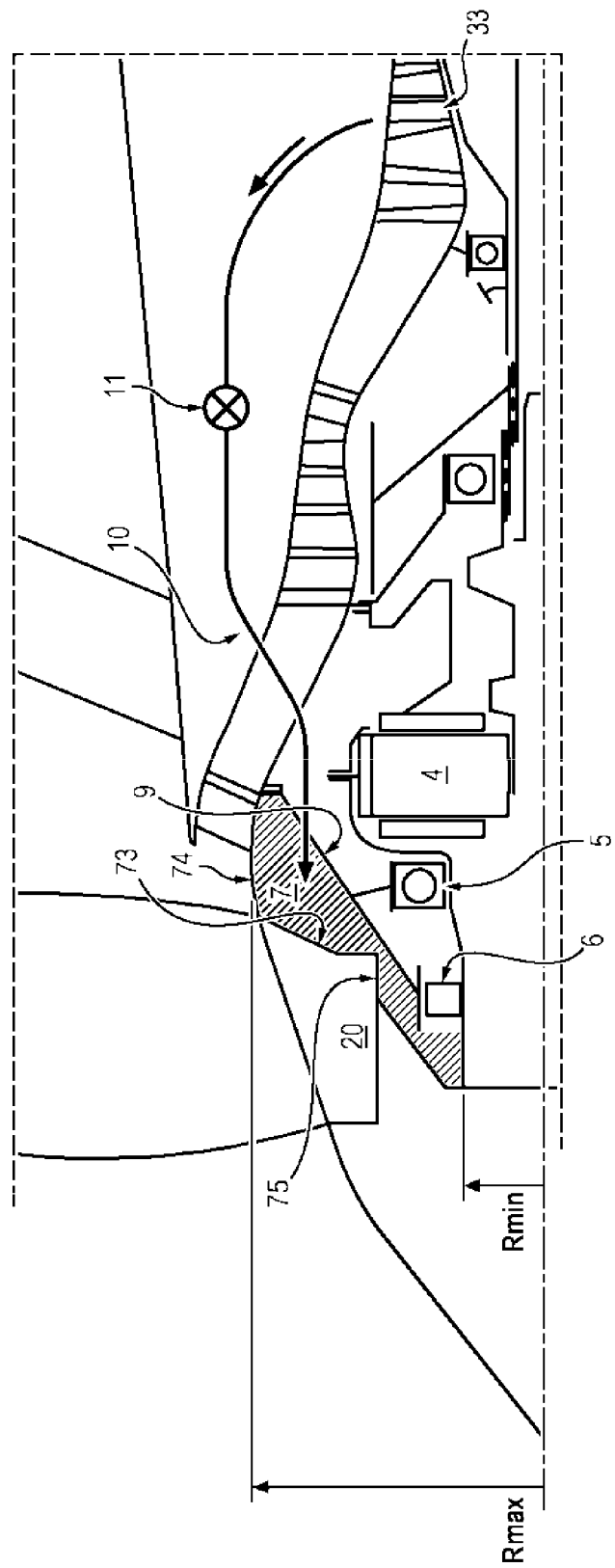
FIG. 3 is a schematic view of the inside upper part of a turbomachine casing of the invention comprising a gas feed duct.

FIG. 3 illustrates a turbomachine with gearing having a gas feed duct of the invention.

This turbomachine, downstream of the fan 2 and in particular of the disc 20, comprises an enclosure 7. This Figure also shows several parts of the disc 20: the hub 210, hairpin web 211 and rim 212 on which the blades 21 are secured. The enclosure 7 is axially limited upstream by the disc 20 and by a front partition 73 extending from the disc 20 (at the rims 212) as far as a downstream end of the vanes of the airflow straightener stage 310. The enclosure 7 is also limited at the lower end by the shaft 3, and downstream by the bearing support 9 extending around the bearings 5 and 6. The enclosure 7 uses the axis of the engine 37, represented by a dotted line in the Figure, as axis of symmetry of revolution.

The minimum radius, denoted Rmin, of the enclosure 7 is reached in the vicinity of the shaft 3, at an outer wall 75 of small radius, said wall being positioned in the vicinity of the blade platforms of the fan 2. The maximum radius, denoted Rmax, of the enclosure 7 is reached downstream of the fan disc 20 at an outer wall 74 of large radius. The outer wall 74 of large radius extends against a first-stage airflow straightener 310. The vanes of the airflow straightener 310 can be called Inlet Guide Vanes (IGV).

In the invention, the turbomachine of FIG. 3 comprises a gas feed duct 10 having a front end which opens into the enclosure 7 through the bearing support 9 enclosing bearings 5 and 6. The rear end of the duct 10 is positioned in an airstream of the high-pressure compressor 33. The rear end of the duct 10 is therefore exposed to the air of the primary airflow set in movement by the high-pressure section. The duct 10 forms a feed and pressurizing channel for the enclosure 7. The front part of the duct 10 can advantageously be arranged in arms of the inlet casing 1, thereby avoiding the generation of additional congestion in the primary airstream of the turbomachine.

Advantageously, the duct 10 is provided with a pilot valve 11, controlling pressurization downstream of the enclosure 7. The pilot valve is adapted to open or close the passage for air arriving from the airstream of the high-pressure compressor 33. The pilot valve 11 can be controlled by a processing unit so that it opens when engine speed is below the threshold rotation speed, the turbomachine then considered to be operating in flight idling or approach phase. The pilot valve 11 can be controlled so that it is closed when engine speed is above this threshold rotation speed. In FIG. 3, the valve 11 is positioned above the low-pressure compressor; however, alternatively, this valve could be positioned at any position along the duct 10.

The bleed stage of the high-pressure compressor, in other words the axial position of the rear end of the duct 10 for air intake under pressure, is chosen in accordance with the pressurization needs of the enclosure 7. The more this bleed stage is chosen to be further downstream in the high-pressure compressor the higher the pressure in the duct 10, but the more this will affect the performance of the high-pressure compressor. It is possible to install several ducts 10, e.g. ducts 10 taking air at different bleed points at the high-pressure compressor 33 as a function for example of the rotational speed of the high-pressure compressor. For example, said bleed points can be positioned at 0% or 100% airstream height within the high-pressure compressor to limit aerodynamic impact on the airstream of the high-pressure compressor.

The functioning of the duct 10 for pressurization of the enclosure 7 can be as follows: during normal flight phases when the axial force towards upstream is sufficient for the fan 2, the valve 11 is closed and the enclosure 7 is not pressurized. During some flight phases e.g. idling phases of the turbomachine, the valve 11 is controlled to open and clear the passageway for pressurized air (illustrated in FIG. 3 by arrow F) taken from the high pressure compressor 33, which transits by the duct or ducts 10 and comes to generate an axial force on the fan 2.

For the arrangement illustrated in FIG. 3, with a minimum radius Rmin of between 50 and 150 millimeters and a maximum radius Rmax of between 300 and 600 millimeters, the results obtained are the following, during an idling phase of the engine and at mean operating temperature:
  pressure between 0.5 bar and 0.8 bar in plane «P27» of the fourth stage of the high-pressure compressor,
  minimum axial pre-load for bearing 5 (or bearing 1B) estimated at 1.5 tonnes, to prevent reversal of the axial force at bearing 5,
  axial force effectively obtained for bearing 5, with $F=S*p$ where F is the axial force, S the surface upon which the force is applied and p the pressure in plane P27: this gives an axial load of 2.5 tonnes, i.e. more than the axial load required to prevent reverse of the axial force at the bearing.

It will be noted that during a pressurization phase of the enclosure 7, it is possible that air may move up into the pressurization tubes 60 (independent of the duct or ducts 10) which limit oil leakage at bearing 6. To avoid perturbing ventilation of the front module of the turbomachine during phases when the enclosure 7 is pressurized by duct 10, it is possible to arrange at least one check valve 61 in said pressurization tubes 60.

One advantage of said check valve is that during phases (e.g. flight idling) when the enclosure 7 is pressurized to apply an axial force on the fan 2, the rising of air into the pressurization tubes 60 is prevented, thereby increasing the imperviousness of the enclosure 7. It is possible that minor leaks may occur from enclosure 7 towards the inside of the enclosure containing the bearings 1R and 1B, without having an impact on the functioning of the components of the forward module of the engine and on the fluids used for example to lubricate the bearings.

Examples of Positioning of the Feed Duct

Figure 4:
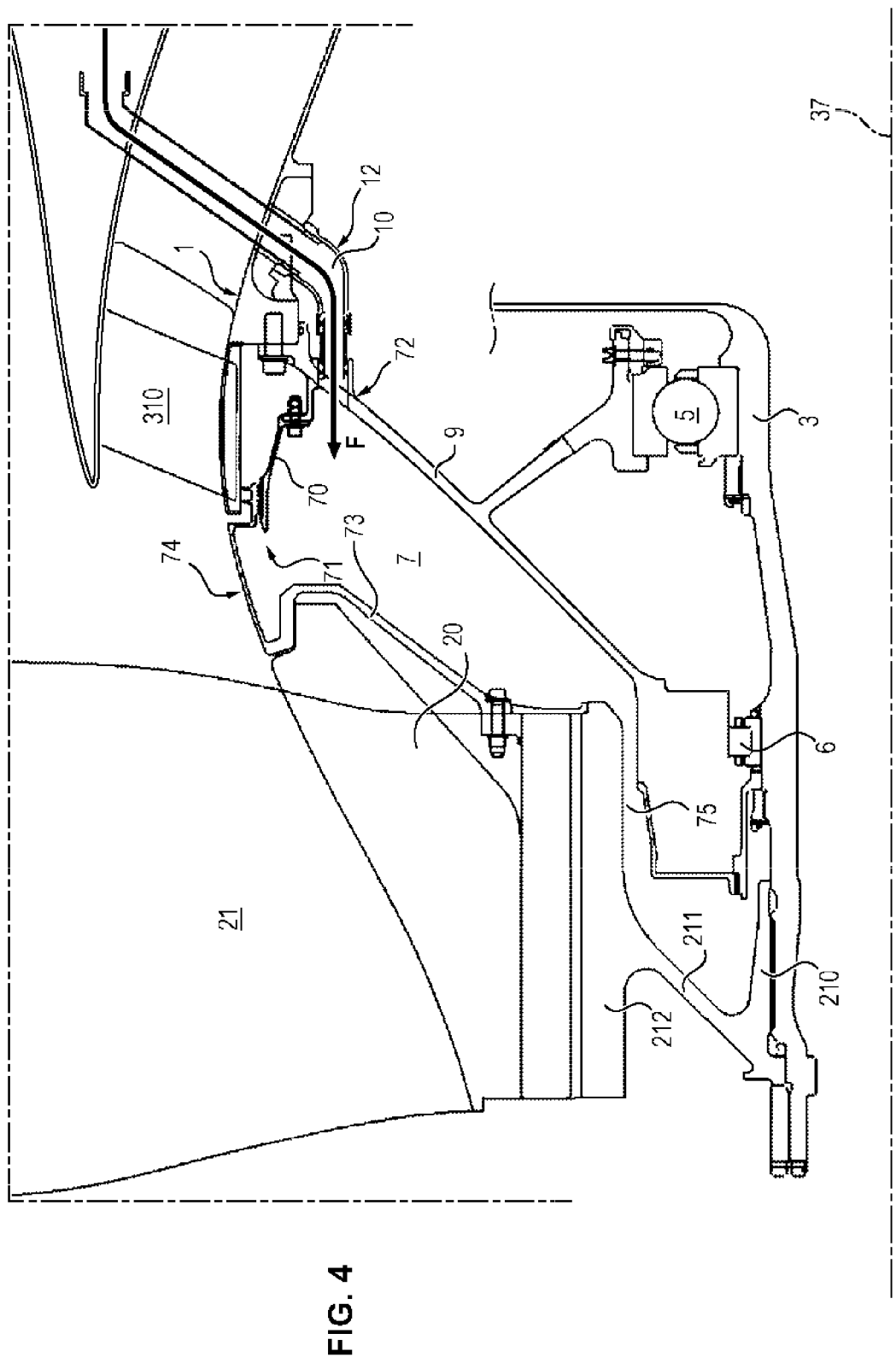
FIG. 4 is a view of the front part of the inside of a turbomachine casing according to a first embodiment of the invention.

FIG. 4 illustrates the front module of a turbomachine provided with a pressurized air feed duct 10 such as described above in connection with FIG. 3, according to a first embodiment.

In this front module the bearing 5 is a ball bearing arranged around the fan shaft 3, and bearing 6 is a cylindrical roller bearing arranged in a bore made around the shaft 3. Bearing 6 is positioned in a cavity radially limited by the fan shaft 3 and by the disc 20 and in particular by the rim 212 of the fan disc 20. Said cavity is positioned longitudinally upstream of bearing 5.

In this embodiment, the duct 10 passes through an arm 12 of the inlet casing 1, behind the airflow straighteners 310, and arrives in the enclosure 7 via a piercing 72 made in the bearing support 9. The duct 10 is arranged to ensure sufficient pressurization of the enclosure 7, in particular at low idling speeds of the turbomachine, generating an axial force towards upstream on the wall of the enclosure 7 in contact with the fan disc 20.

Advantageously, the duct 10 leads into the enclosure 7 at a piercing 72 facing a side portion of the disc 20. The piercing 72 is arranged underneath the flange 90 attaching the bearing support 9 to the casing, in the vicinity of and below the outer wall 74 of large radius of the enclosure 7. The wall 74 of large radius delimits the area of largest radius Rmax of the enclosure 7. The piercing 72 here is positioned opposite the airflow straighteners 310.

Also, an additional ferrule 70 is installed on that part of the enclosure 7 that is furthest distant from the shaft 3, to ensure imperviousness of the enclosure 7 and obtain sealing thereof. In this example, the ferrule 70 is arranged between the flange 90 and the wall 74 of large radius.

A purge hole 71 can optionally be arranged on said part of the enclosure to provide an additional pathway for air leaving the enclosure. One advantage of the purge hole 71 is to allow control over cooling of the disc 20.

Examples of implementation of the ferrule 70 are described in detail below.

Figure 5:
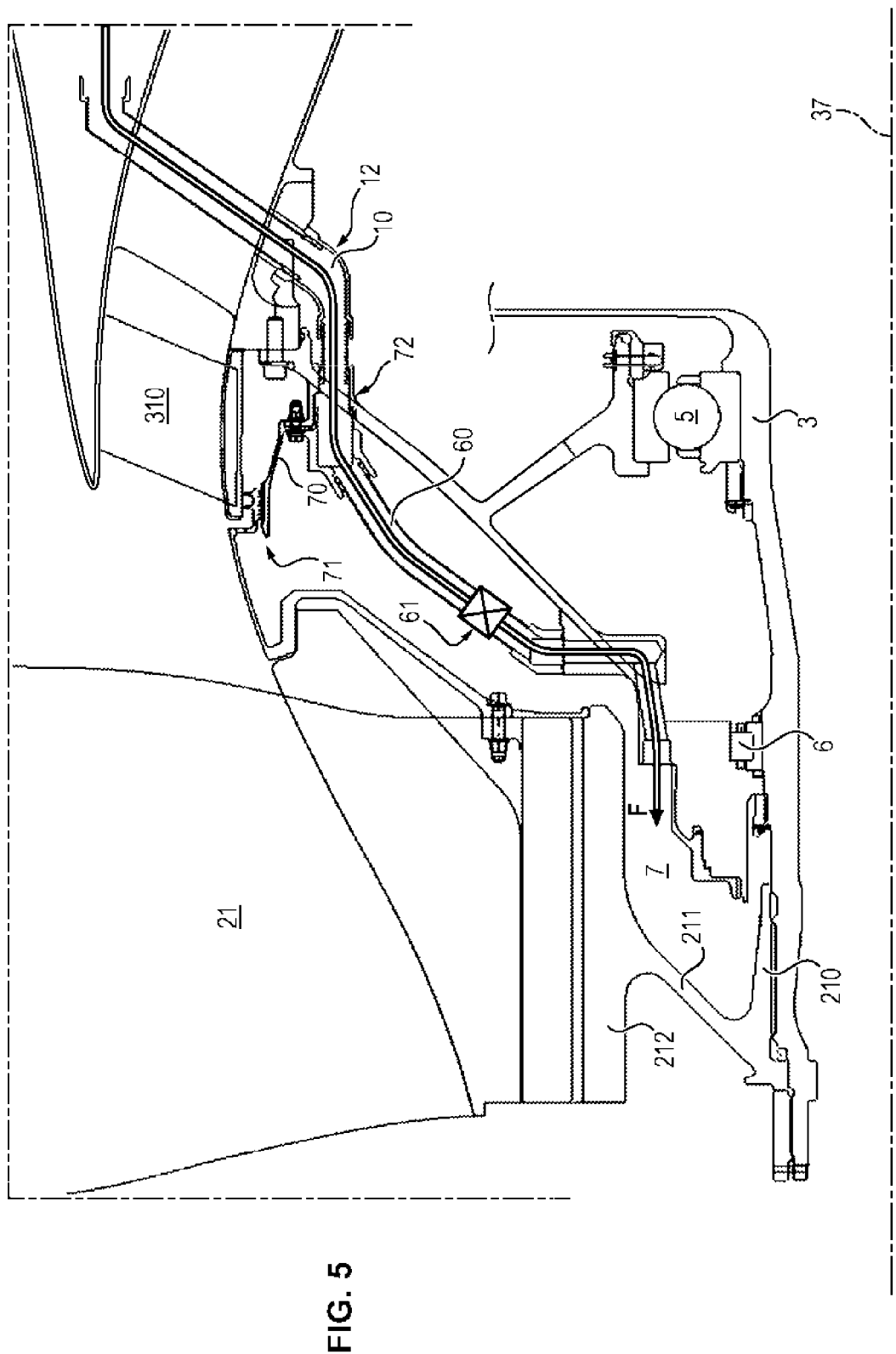
FIG. 5 is a view of the front part of the inside of a turbomachine casing according to a second embodiment.

FIG. 5 illustrates another variant of embodiment for a front module of a turbomachine provided with an air feed duct.

In this embodiment, the enclosure 7 is fed with pressurized air in the area of the enclosure of small radius. The duct 10 opens into the area of the enclosure 7 extending around the second bearing 6 (corresponding to the roller bearing the furthest upstream of the turbomachine). The enclosure 7 comprises a «rotor cavity» corresponding to the part the furthest upstream of the enclosure, this cavity being limited upstream by the hairpin web 211, limited downstream by the bearing support 9 and radially limited externally by the rim 212 supporting the blades 21. The rotor cavity corresponds to an area of the enclosure 7 of smaller radius than the area of the enclosure 7 positioned opposite the airflow straightener stage 310.

In this variant of embodiment, the duct 10 can extend partly into a pressurization tube 60 of bearing 6 and its enclosure. The end of duct 10 opens into the enclosure 7 via a piercing 76 made in the bearing support 9, above bearing 6. One advantage of this configuration is that the existing structure of the pressurization tube of bearing 6 can be used for duct 10, thereby reducing congestion.

A further advantage of this latter embodiment is to allow recompression of air arriving in enclosure 7 via the duct 10: the airflow leaving the piercing 76 moves towards outside the enclosure 7 into areas of larger radius. This movement of air is illustrated by the arrow F', and generates a «vortex effect» generating recompression of the air flow.

Imperviousness of the Enclosure Downstream of the Fan

Figure 6:
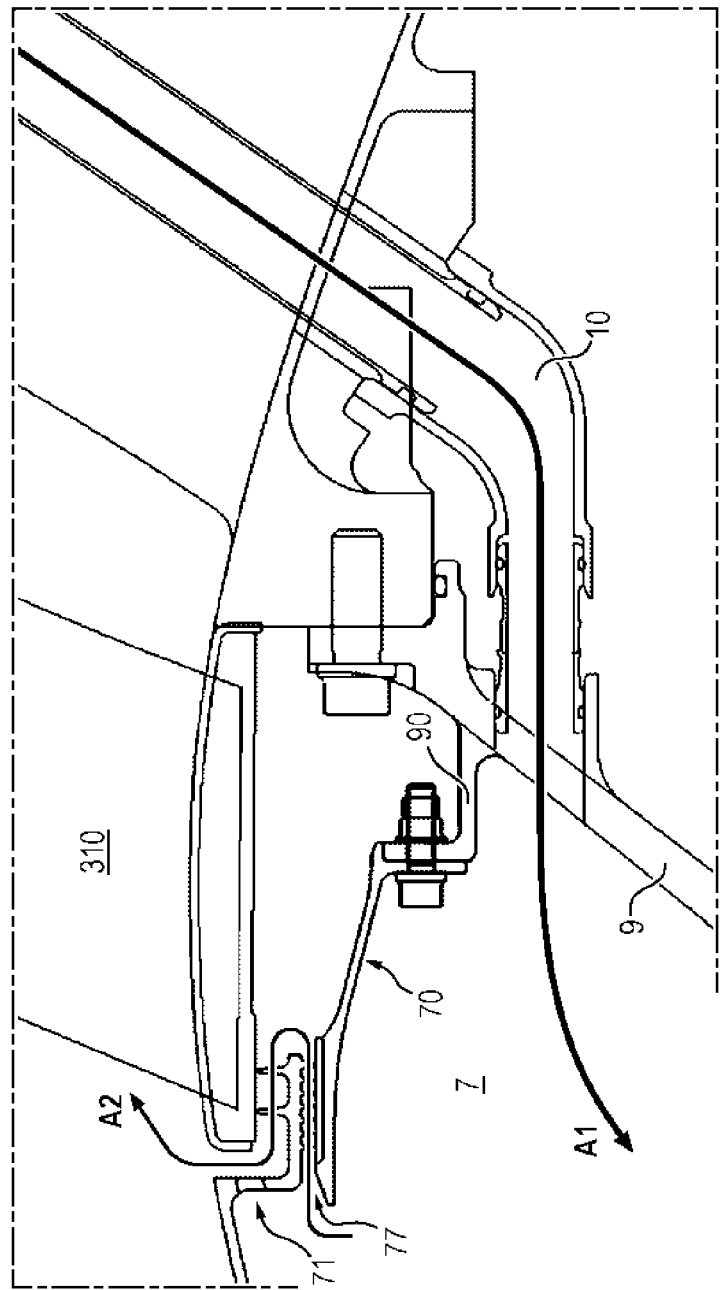
FIG. 6 illustrates the top of an enclosure downstream of the fan of a turbomachine according to one particular embodiment.

FIG. 6 illustrates the top part of the enclosure 7 for the front module in FIG. 4, in the vicinity of the outer wall 74 of large radius of the enclosure 7 delimiting the area of largest radius. However, the elements shown in connection with FIG. 6 can be transposed to the front module of any turbomachine of the invention, in particular the front module of the turbomachine illustrated in FIG. 5 with a duct 10 opening via a piercing made in the bearing support 9.

Figure 7A:
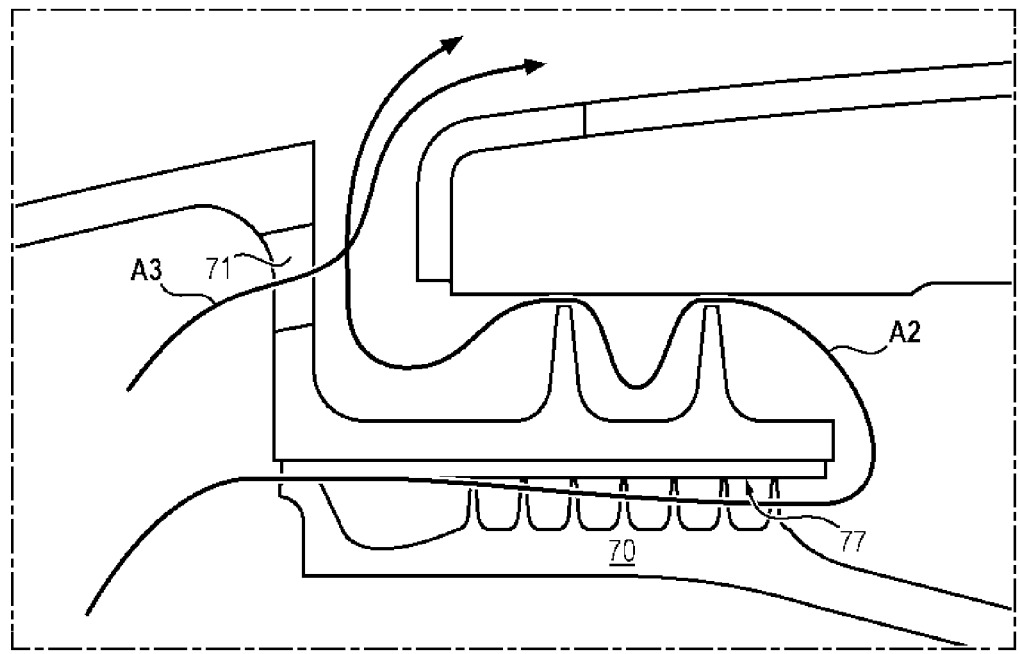
FIG. 7a is a close-up view of a ferrule for the top part of an enclosure downstream of a turbomachine fan, according to a first variant.

The ferrule 70 is arranged between the flange 90 allowing the securing of the bearing support 9, and the outer wall of the enclosure 7 opposite the airflow straightener stage 310. The ferrule 70 comprises a seal 77 which ensures increased sealing of the enclosure 7. For example, the seal 77 is a labyrinth seal. FIG. 7a gives a close-up view of the ferrule 70. A pressurized air pathway A1 conveys air into the enclosure 7 via duct 10; to escape from the enclosure 7 and if the purge hole 71 is not open, air must take pathway A2 and transit via the seal 77 of the ferrule 70. Advantageously, but not necessarily, a purge hole 71 can be provided to calibrate the purge flow rate of the enclosure. The purge hole 71, when open, clears another pathway A3 for air leaving the enclosure 7.

Figure 7B:
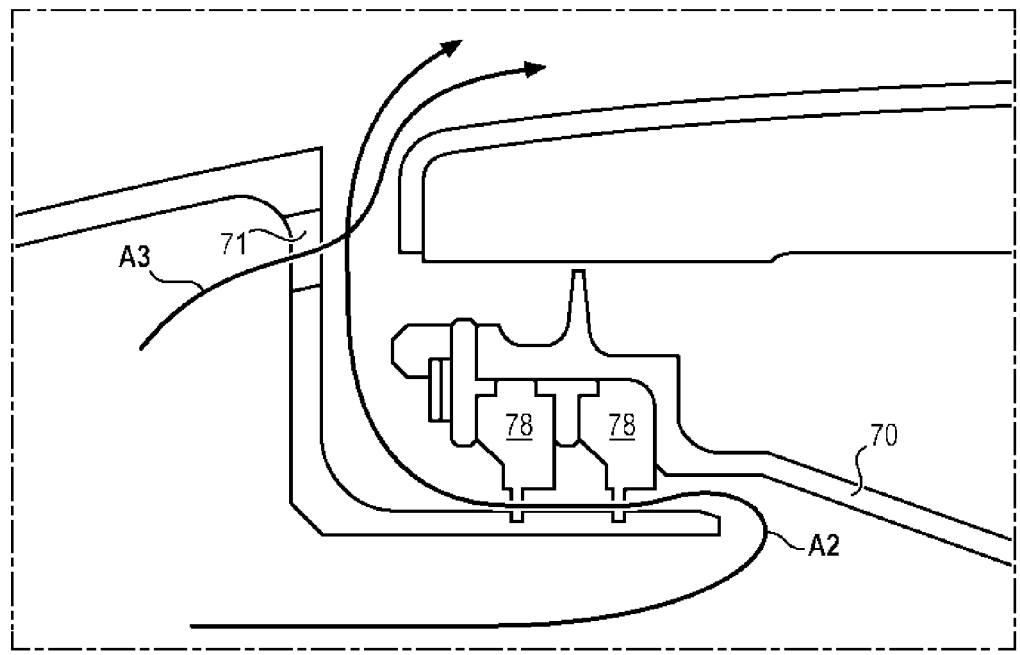
FIG. 7b is a close-up view of a ferrule according to a second variant.

FIG. 7b shows a variant of embodiment of the ferrule 70. Here the ferrule 70 ends in a seal comprising a dual brush 78. The installing of this dual-brush seal is obtained with anti-rotation and axial locking. The channel facing the bristles of the dual-brush seal 78 is treated before the turbomachine is set in operation to protect against wear due to friction of the brush bristles. Said dual-brush seal is advantageous in that it allows a reduction in leaked air flow rate and can absorb more radial mismatch throughout operation of the turbomachine.

The invention claimed is:

1. A turbomachine comprising a fan driven in rotation by a shaft in relation to an inlet casing of the turbomachine, the fan comprising blades mounted on a fan disc, the shaft being supported by a first bearing positioned downstream of the fan, said first bearing comprising an outer ring attached to the inlet casing,
    wherein the turbomachine comprises at least one gas feed duct with a first end opening into an enclosure positioned against the disc and a second end positioned in an airstream of a high-pressure compressor, the turbomachine further comprising a ferrule imperviously sealing the enclosure,
    wherein the at least one gas feed duct is adapted to be fed at the second end by pressurized gas taken from the airstream of the high pressure compressor,
    wherein the gas feed duct is provided with a valve to control the conveying of said pressurized gas into the enclosure,
    wherein the turbomachine further comprises a processing unit configured to control the valve so that:
        the valve opens when an engine speed is below a threshold rotation speed, the turbomachine being then considered to be operating in flight idling or approach phase, so that said conveyed pressurized gas applies an axial upstream force on the disc,
        and the valve is closed when the engine speed is above the threshold rotation speed, the turbomachine being then considered to be in take-off or cruising phase.

2. The turbomachine according to claim 1, wherein the enclosure is longitudinally limited by the disc and by a bearing support surrounding the shaft and the first bearing, and wherein the at least one gas feed duct comprises a gas feed duct leading into the enclosure via a piercing made in the bearing support.

3. The turbomachine according to claim 1, wherein the at least one gas feed duct comprises a gas feed duct which leads into the enclosure at a piercing facing a side portion of the disc.

4. The turbomachine according to claim 3, wherein the gas feed duct which leads into the enclosure, leads into the enclosure in the vicinity of an outer wall of smaller radius of the enclosure.

5. The turbomachine according to claim 1, wherein the shaft is also supported by a second bearing positioned upstream of the first bearing, said second bearing comprising an outer ring attached to an annular support secured to the inlet casing, and wherein the at least one feed duct comprises a gas feed duct opening in the vicinity of said second bearing.

6. The turbomachine according to claim 1, wherein the ferrule is arranged opposite vanes of a first-stage airflow straightener.

7. The turbomachine according to claim 1, wherein the ferrule comprises a labyrinth seal or dual-brush seal.

8. The turbomachine according to claim 1, further comprising at least one pressurization tube opening into the enclosure, the pressurization tube comprising a check valve.

9. The turbomachine according to claim 1, further comprising reduction gearing to modify a rotational speed of the fan.

10. A turbomachine comprising a fan driven in rotation by a shaft in relation to an inlet casing of the turbomachine, the fan comprising blades mounted on a fan disc, the shaft being supported by a first bearing positioned downstream of the fan, said first bearing comprising an outer ring attached to a bearing support, said bearing support surrounding the shaft and the first bearing, said bearing support further extending radially as far as a flange that is fixed relative to the inlet casing underneath a first-stage airflow straightener, wherein the turbomachine comprises at least one gas feed duct with a first end opening into an enclosure positioned against the disc and a second end positioned in an airstream of a high-pressure compressor, wherein the at least one gas feed duct is adapted to be fed at the second end by pressurized gas taken from the airstream of the high pressure compressor so that said gas applies an axial upstream force on the disc during some operating phases of the turbomachine, wherein the turbomachine further comprises a ferrule imperviously sealing the enclosure, said ferrule being arranged opposite vanes of the first-stage airflow straightener between the flange and a wall of large radius delimiting an area of largest radius of the enclosure, said wall of large radius extending against the first-stage airflow straightener.

11. The turbomachine of claim 10, further comprising a valve to control the conveying of said pressurized gas into the enclosure and a processing unit configured to control the valve so that:

the valve opens when an engine speed is below a threshold rotation speed, the turbomachine being then considered to be operating in flight idling or approach phase, so that said conveyed pressurized gas applies an axial upstream force on the disc, and the valve is closed when the engine speed is above the threshold rotation speed, the turbomachine being then considered to be in take-off or cruising phase.

12. The turbomachine according to claim 10, wherein the enclosure is longitudinally limited by the disc and by the bearing support, and wherein the at least one gas feed duct comprises a gas feed duct leading into the enclosure via a piercing made in the bearing support.

13. The turbomachine according to claim 10, wherein the at least one gas feed duct comprises a gas feed duct which leads into the enclosure at a piercing facing a side portion of the disc.

14. The turbomachine according to claim 13, wherein the gas feed duct which leads into the enclosure, leads into the enclosure in the vicinity of an outer wall of smaller radius of the enclosure.

15. The turbomachine according to claim 10, wherein the shaft is also supported by a second bearing positioned upstream of the first bearing, said second bearing comprising an outer ring attached to an annular support secured to the inlet casing, and wherein the at least one feed duct comprises a gas feed duct opening in the vicinity of said second bearing.

16. The turbomachine according to claim 10, wherein the ferrule comprises a labyrinth seal or dual-brush seal.

17. The turbomachine according to claim 10, further comprising at least one pressurization tube opening into the enclosure, the pressurization tube comprising a check valve.

18. The turbomachine according to claim 10, further comprising reduction gearing to modify a rotational speed of the fan.

* * * * *